INVENTOR.
Joseph C. Duddy

United States Patent Office

3,702,266
Patented Nov. 7, 1972

3,702,266
METHOD FOR PROCESSING PASTED LEAD
ACID BATTERY PLATES
Joseph C. Duddy, Trevose, Pa., assignor to
ESB Incorporated
Filed Nov. 12, 1970, Ser. No. 88,945
Int. Cl. H01m 35/26
U.S. Cl. 136—33                                        14 Claims

ABSTRACT OF THE DISCLOSURE

A method for processing freshly pasted lead acid storage battery plates prior to formation is described in which the plates are first rapidly frozen by exposure to sub-zero temperatures and then warmed, preferably by exposure to high frequency radiation. The plates may be stored for any length of time in the frozen state.

BACKGROUND OF THE INVENTION

(1) Field of the invention

This invention relates to the processing of positive and negative lead acid storage battery plates of the pasted variety. In particular, it relates to the processing between the pasting and the forming operations.

(2) Description of the prior art

In the usual preparation of pasted (or Faure) type lead acid plates, a mixture of lead oxides containing some unreacted lead, sulfuric acid and water, normally called paste, is prepared. This paste, having a consistency varying from a stiff butter to a soft room temperature butter, is smeared or "pasted" into a grid. This operation can be done by hand but is usually done on a "pasting machine." The grid is a lead or lead alloy casting and is usually made with an outside frame, a lug, and vertical and horizontal bars crossing from one side of the frame to the other.

After the pasting operation is completed, it is usual practice to "set" the plates. In the setting operation, a series of rather slow chemical reactions occur including evaporation of water, oxidation of lead particles, absorption of carbon dioxide from the air, and combining reactions between lead oxide, lead sulfate and water. The result of the setting operation is that the paste becomes a hard, non-sticky solid. The reactions which occur in setting determine to a considerable extent the behavior of the battery both with regard to capacity and with regard to life. It is therefore an important and critical part of the battery processing.

The setting reaction is exothermic. The heat is believed due to the oxidation of the lead particles in the paste. The reaction does not start until some of the water has evaporated from the paste so as to allow free access of atmospheric oxygen to the lead particles in the presence of water. Like many other chemical reactions, it goes faster at high temperatures than at low temperatures. In a normal process step, freshly pasted plates are piled on a pallet and set aside. The water in the pile of plates slowly evaporates until the reaction point at a preferred site is reached. As soon as the reaction starts, the temperature rises, aiding the evaporation of water at other sites and increasing the speed of the reaction when it occurs. This self-accelerating reaction continues until the lead particles are all used up and the pile of plates then cools down to room temperature. The entire cycle may take 2 to 5 days, the greater part of this being spent in the preliminary drying operation. Temperatures up to 160° or more may be reached by parts of the pile.

Following the setting operation, the plates are "formed." In the formation treatment, the plates are placed in sulfuric acid solution and given an electrical treatment. The "positive" plates are connected to the positive side of a direct current source and the "negative" plates are connected to the negative side of the same direct current source and a pre-determined quantity of electricity is passed from plate to plate. At the completion of formation, the positive material is substantially all converted to lead peroxide—a blue-black material—and the negative material to sponge lead—a grey material. After formation, the plates of both varieties are often dried.

Battery plates are convenient to handle either in the unformed, set condition or in the formed and dried condition. They can be stored for long lengths of time in either of these states.

It is a common practice to build batteries using unformed, set plates and form the plates in the actual battery containers. In this case, following the formation, the batteries are ready for shipment to the customer in a charged and wet state. Where it is desirable to ship out a dry or dry charged battery, the battery is usually built using plates formed and dried outside of the container.

Unfortunately, the setting operation is subject to many variables. These are introduced by changes in the ambient temperature and humidity, the location of a particular plate in a setting rack or pile and the position of a rack or pile on a particular skid. The pasted plates, as they emerge from the pasting machine, are sticky and if they touch, paste will be pulled from one plate while attaching to another plate. If the freshly pasted plates are piled, they will cement together in the setting operation forming one large useless mass.

Numerous systems are used by battery manufacturers to avoid the problems of the classic setting process. A very common practice is to remove the moisture from the surface of the pasted plate by a short or comparatively short exposure to high temperature gas. When this is done properly, plates so treated can be piled up in piles several feet high and in this condition are put aside for the setting operation.

The plates can be dipped in or sprayed with sulfuric acid or ammonium sulfate.

In some cases, the plates can be formed directly from the pasting operation without setting. However, where this is done, because of the softness and stickiness of the paste, the plates are very subject to handling damage.

It is obvious that any process that requires several days for completion such as the setting operation is a considerable annoyance to the battery manufacturer. It also represents, especially in a large operation, a considerable tie-up of inventory with its attendant costs.

It has been found that plates can be fully set by treating them in steam in an autoclave at 212° F. They can also be rapidly set by clamping them between metal plates held at a temperature of 212° or higher. Although these processes have shown the possibilities of rapid plate setting, neither one lends itself to efficient large-scale manufacture.

There is considerable interest in finding a more uniform, rapid and less critical method for treating pasted battery plates after the pasting operation.

SUMMARY OF THE INVENTION

In the process which forms the invention, positive and negative storage battery plates, pasted in the normal manner, are frozen without the removal of water directly after the pasting operation. Some time after freezing, the plates are rapidly heated up from the frozen state to an elevated temperature somewhat below the boiling point of water by the use of microwaves in a capacitative field.

Under these conditions, the setting operation occurs in a matter of hours or fractions of an hour rather than days.

In a modification of the process, the plates, after the initial freezing, are built in to batteries. The batteries are heated up to near boiling and the plates are allowed to set in situ without further heating. After the batteries have cooled down and the setting is completed, the batteries are filled with acid and formed in the usual manner. The batteries in the frozen state may be stored indefinitely.

Although the full invention includes both the freezing technique and the rapid heating technique, it is within the scope of this invention to use either of these new process steps alone with more conventional process steps for the remainder of the plate processing.

The freezing operation may be done slowly, i.e., in a matter of hours, or it may be done rapidly, i.e., in a matter of seconds or minutes. There is a manufacturing advantage to using the quick freezing embodiment of the invention as it fits best with the mass production techniques used to make battery plates.

The freezing of the invention is differentiated from freeze-drying processes where a majority of the moisture of the product is removed during or immediately subsequent to the freezing step. It is necessary that the moisture be retained as it is required in the subsequent setting operation.

The freeze operation which forms a first step in the new process provides a plate within minutes which can be handled as safely and with as little breakage as a fully set plate taking several days to process.

It is found that when frozen plates are allowed to warm up to room temperature, they can be handled by normal methods without damage. The frozen or frozen and thawed plates can be racked and allowed to set in the normal way. The reaction in this case takes several hours. The plates so processed are satisfactory in every way.

The second step of the process, a rapid heating by the use of microwaves in a capacitative field, has an advantage over most other heating methods in that the battery paste is heated uniformly throughout its thickness with a minimum of surface evaporation. This differs considerably from the normal type of surface drying where the surface of the plate is both heated and dried while the inside of the plate stays cool and unchanged. Because the entire cross section of the paste, and in particular, the water in the paste is heated with the microwave energy, the setting operation which normally takes several days at room temperature occurs within a matter of minutes or hours at the elevated temperatures of the invention. Some of the advantages of the microwave heating process include:

(a) greater uniformity because all plates receive exactly the same treatment;
(b) a more rapid processing method;
(c) a less critical process because there are fewer process variables to control.

Three additional benefits have been found with the quick freeze process. These are:

(d) quick freeze treated plates are free from shrinkage cracks, whereas plates treated in the usual way often show cracking of the active material from too rapid loss of moisture. It is believed that an expansion effect is produced on freezing that prevents subsequent cracking;
(e) the quick freeze plates show a definite improvement in capacity especially at low rates of discharge;
(f) many of the presently used plate processing methods produce considerable scrap. The quick freeze process appears to be free from this fault.

DESCRIPTION OF THE PREFERRED EMBODIMENTS

Figure 1:
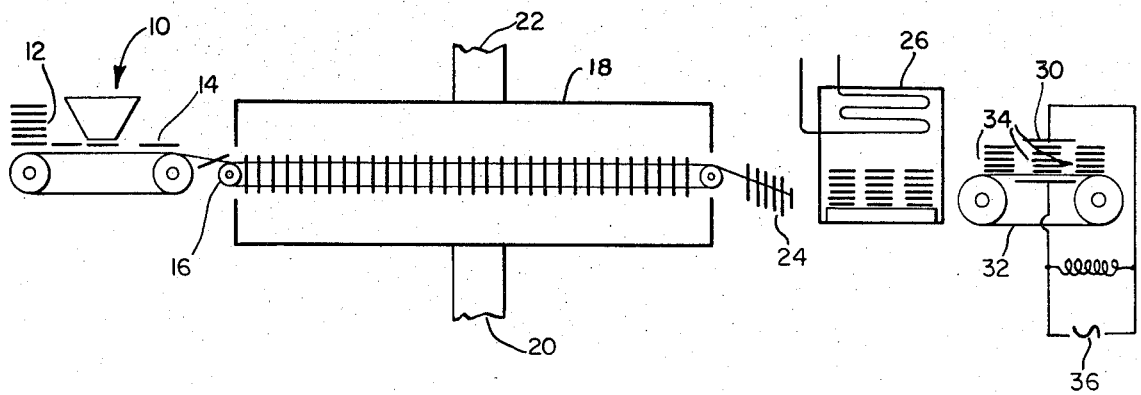
FIG. 1 shows in diagrammatic form the apparatus required to carry out the invention.

In FIG. 1, 10 represents a pasting machine in which grids indicated at 12 are fed into the machine and emerge with a loading of paste at 14. From the pasting machine 10, the plates are fed to conveyor 16. The pasted plates are transported by conveyor 16 through quick freeze box 18 in which they are rapidly frozen. Cold air is fed to the quick freeze box by duct 20. Duct 22 carries the spent air to an air cooling device for re-cooling. The frozen plates collect at a take-off 24 from which the plates are taken for piling and possible storage. Room 26 represents a low temperature storage chamber in which the frozen plates can be stored prior to use. A microwave oven 30 having a continuous feed belt 32 with plate piles 34 thereon energized by microwave source 36 is shown by which the plates are rapidly heated to 60–80° C. and then allowed to cool. During the time of heating and cooling, the setting operation occurs with the result that when the plates are cool enough to handle after the microwave treatment, they are ready for a next processing step.

The higher the temperature, the more rapid will be the setting reaction. However, if the maximum temperature reached by the plate during the heating or setting operations reaches the boiling point (100° C.), the evolution of steam from the plate will cause the active material to fall out and ruin the plate. When the plates are heated to temperatures of about 60° C., the setting time will be in the order of 2 to 4 hours. When the heating temperature reaches 80°, the setting time will be approximately 30 to 60 minutes.

Figure 2:
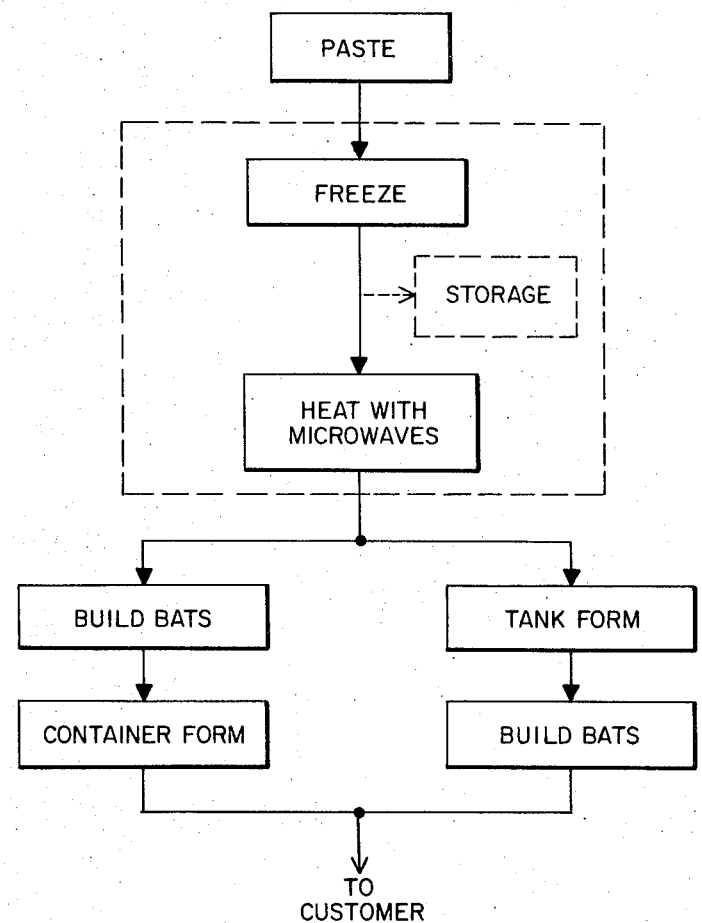
FIG. 2 shows in block form a first embodiment of the process of the invention.

In FIG. 2, a block drawing of a complete plate process is shown. The areas relating to the invention are shown within the dotted lines.

Figure 3:
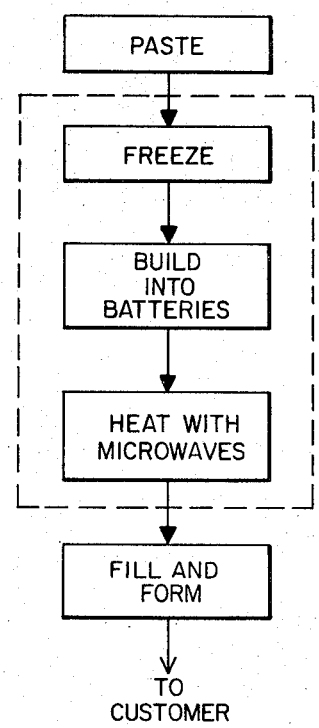
FIG. 3 shows in block form a second embodiment.

The block drawing shown in FIG. 3 shows a further embodiment of the invention in which frozen plates are built immediately into batteries and stored in the frozen condition. When they are needed, the batteries are removed from storage and heated by microwave power. Setting follows immediately on the heating and the conditioned batteries are ready for formation and shipment.

Figure 4:
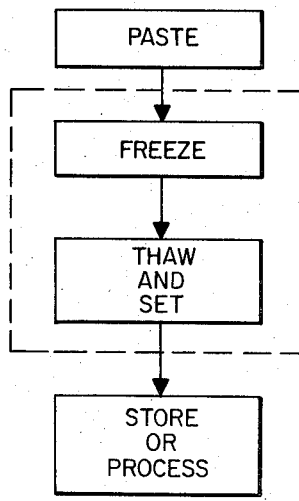
FIG. 4 shows in block form a third embodiment.

The processes indicated in FIG. 4 illustrate an embodiment of the invention making use of the freezing technique alone without the accompanying rapid microwave heating.

Figure 5:
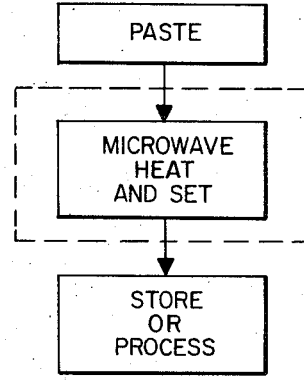
FIG. 5 shows in block form a fourth embodiment.

The process indicated in FIG. 5 illustrates an embodiment of the invention making use of the microwave heating and setting operation without the preceding freezing step. As in FIG. 3, the areas of FIGS. 3, 4 and 5 enclosed by the dashed lines are the part of the drawing related specifically to the invention.

Although the oven shown in FIG. 1 is limited to temperatures not greater than about 80° C., higher temperatures can be used if the oven is pressurized.

Figure 6:
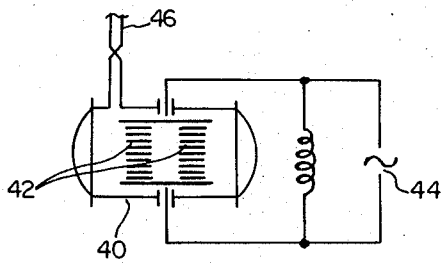
FIG. 6 shows in diagrammatic form an apparatus for performing another embodiment of the invention.

FIG. 6 shows such an oven or autoclave 40 with piles of plates 42 therein. A power source 44 feeds microwave energy to the interior of the oven. The oven is pressurized with steam via pipe 46. With an oven of this type, the setting operation can be completed in a few minutes. In order to prevent the paste from being blown out of the plate, the temperature to which it is raised must be less than the boiling point of water at the pressure used. This relationship is well known and is given in textbooks of steam tables.

EXAMPLE I

Freshly pasted twin positive plates of automobile battery type were placed on an aluminum sheet resting on a block of Dry Ice. After 45 seconds, they were turned over on the sheet for an additional 45 seconds. The thoroughly cooled plates were placed on a rack and allowed to set for 3 days.

Batteries of 24C and 60 size were built using these plates and tested as follows in comparison with plates processed in the normal manner without the freezing step.

Battery #1: Frozen positive plates
Battery #2: Control (normal treatment)

| | Ampere hours, 20 hr. rate | 5 sec. volts (0°) | Minutes (0°) | Life cycles |
|---|---|---|---|---|
| 1 | 60.3 | 9.7 | 6.05 | 290 |
| 2 | 60.3 | 9.65 | 6.10 | 309 |

EXAMPLE II

Twin positive pasted plates supported by their lugs about ½ inch apart were subjected to a high velocity stream of air at 0° F. The quantity of air per plate of about 6 x 5⅝ x .065 thick was about 100 cu. ft. or about 200 cu. ft per pound of plates. The time of exposure was approximately 6 minutes. At the end of this treatment, the plates were fully frozen.

100 of these plates were then piled and placed in a microwave oven. A power input of 4 kw. was fed to the oven for a period of 6 minutes. The frequency of the microwave was 2450 megahertz. The efficiency of the oven was about 50%. The plates were then allowed to cool. A battery size 24C-60 was built using these plates. It gave on test the following:

Ampere hours, 20 hr. rate _____ 59.5
5 sec. volts (0°) _____ 9.7
Minutes (0°) _____ 6.0

Having fully described my invention and given examples of its application to the manufacture of storage batteries, I claim:

1. A method for treating an unformed, unset lead acid storage battery plate which comprises:
   (a) freezing an unset plate without removal of moisture therefrom;
   (b) unfreezing the unset plate by addition of heat; and
   (c) setting the plate.

2. A method for treating an unformed, unset lead acid storage battery plate as defined in claim 1 wherein the addition of heat is performed by exposure to microwave energy in a capacitative field.

3. A method as defined in claim 2 wherein the microwave energy has a frequency of approximately 2450 megahertz.

4. A method as defined in claim 1 wherein the freezing of the plates is accomplished by exposure to low temperature air.

5. A method as defined in claim 4 wherein the temperature of the air is aproximately 0° F.

6. A method as defined in claim 1 wherein the addition of heat is performed by exposure to room temperature air.

7. A method for treating unformed, unset lead acid storage battery plates prior to container formation which comprises:
   (a) freezing the unformed, unset plates without the removal of moisture therefrom;
   (b) assembling an unformed battery using the unformed, unset frozen plates;
   (c) rapidly warming the battery with unformed, unset plates therein to a temperature of 60°–80° C. by exposure to high frequency radiation; and
   (d) allowing the unformed, unset plates within the rapidly warmed battery to set within the battery container.

8. A method as defined in claim 7 wherein the unformed, unset plates are frozen by exposure to low temperature air.

9. A method as defined in claim 8 wherein the temperature of the air is approximately 0° F.

10. A method as defined in claim 7 wherein frequency of the radiation is approximately 2450 megahertz.

11. A method as defined in claim 7 wherein the battery with unformed, unset plates therein is stored in the frozen state.

12. A method for treating an unformed, unset pasted lead acid battery plate which comprises:
    (a) rapidly heating an unformed, unset plate to a temperature between 60° C. and 80° C. by exposure to microwave radiation in a capacitative field and initiating the setting reaction; and
    (b) allowing the setting reaction to continue to completion without further addition of energy.

13. A method for setting an unformed, unset pasted lead acid storage battery plate which comprises:
    (a) placing an unformed, unset plate in autoclave;
    (b) filling the autoclave with a gas to a pressure above atmospheric conditions; and
    (c) heating the unformed, unset plate by exposure to microwave energy in a capacitative field to a temperature below the boiling point of water at the pressure of the gas in the autoclave, whereby the setting reaction will rapidly proceed.

14. A method as defined in claim 13 wherein the frequency of the microwave energy is approximately 2450 megahertz.

References Cited

UNITED STATES PATENTS

| | | | |
|---|---|---|---|
| 3,567,520 | 3/1971 | Dennery et al. | 136—120 FC |
| 2,553,192 | 5/1951 | Hindall | 136—33 |
| 3,271,874 | 9/1966 | Oppenheimer | 34—39 X |
| 2,728,387 | 12/1955 | Smith, Jr. | 34—39 X |
| 3,328,893 | 7/1967 | Schilling | 136—33 X |
| 1,983,995 | 12/1934 | Reinhardt | 34—12 |
| 3,189,484 | 6/1965 | Sundman | 136—33 |
| 3,499,228 | 3/1970 | Port | 34—22 |

ANTHONY SKAPARS, Primary Examiner

U.S. Cl. X.R.

136—27